Aug. 4, 1959     O. MÜLLER     2,898,483

PROGRAM CONTROLLED PARTICULARLY FOR MACHINE TOOLS

Filed Jan. 8, 1958     2 Sheets-Sheet 1

United States Patent Office 2,898,483
Patented Aug. 4, 1959

2,898,483

PROGRAM CONTROLLER PARTICULARLY FOR MACHINE TOOLS

Otto Müller, Amberg, Germany, assignor to Siemens-Schuckertwerke Aktiengesellschaft, Berlin, Germany, a corporation of Germany Application January 8, 1958, Serial No. 707,741

Claims priority, application Germany January 9, 1957

9 Claims. (Cl. 307—115)

My invention relates to the control of machinery, particularly machine tools and other fabricating machines, for automatically performing a number of sequential fabricating operations in accordance with a predetermined program. In a more particular aspect, the invention concerns control systems in which the desired program is pre-set by making electric connections at selected points of intersection in a cross-bar type distributor, whose bus bars are sequentially energized by a selector switch so that after the machine performance is started by closing a switch or issuing a starting impulse, the programmed sequencing operation is carried out automatically up to its termination.

It is an object of my invention to give such program controllers a particularly simple and synoptically surveyable design so as to greatly facilitate adapting the control system for a great variety of different programs. Another object of the invention is to minimize or prevent the occurrence of faulty sequencing as well as faulty performance of the individual steps of programmed operation.

To achieve these objects, and in accordance with a feature of my invention, the cross-bar distributor in a control system of the above-mentioned type, aside from having the above-mentioned bus bars sequentially connected to voltage by a stepping mechanism, is provided with at least two sets of cross bars, and the bars (start-signal bars) of one set are connected with the signal-responsive devices of the fabricating machine, such as contactors or clutches, that selectively control the particular operations to be performed, whereas the cross bars (stop-signal bars) of the other set are connected with the limit switches, feelers or other sensing devices of the same machine which upon completion of each individual machine operation transmit a stop signal to the stepping mechanism of the cross-bar distributor for causing it to advance one step.

Consequently, in such a program-control system, each individual portion of the pre-selected program is initiated by a command or start signal which issues from the cross-bar distributor and causes commencement of a particular fabricating operation which then continues automatically. Simultaneously with the issuance of the start signal, the programming distributor transfers the programming duty to the particular fabricating device then put into operation. When this device terminates its portion of the program, it actuates a stop-signal transmitter consisting of, or controlled by, one of the above-mentioned sensing means. The stop-signal transmitter then controls the distributor to advance one step and to again resume the controlling duty. The programming distributor now issues a new starting signal for the next fabricating portion of the program. The controlling duty thus passes in a continuous cycle from the programming distributor to the fabricating devices of the machinery, thence to the sensing means and back to the programming distributor. Within such a system, it is essential for the present invention that the electric leads for transmitting the commanding or starting signal from the distributor to the fabricating control devices be connected with a first set of cross bars, and that the electric leads of the sensing means, responsive to termination of the fabricating operations, be connected with a different set of cross bars, both sets of cross bars coacting with a group of bus bars correlated to the individual portions of the program. As a result, the correlation of each individual start-signal channel to the particular stop-signal channel for each individual fabricating portion is so simple, lucid and foolproof as to virtually eliminate faulty performance or faulty presetting of the program.

In machine tools, particularly lathes, the above-mentioned sensing means for issuing a stop signal upon completion of a fabricating operation may consist of conventional limit switches. Such a limit switch may determine the length of machining travel of a tool along the work piece. That is, the length of machining travel corresponds to the selected positional adjustment of the limit switch, if the switch is displaceable along the machining path, or the travel corresponds to the selection of one particular limit switch from among a multiplicity of such switches mounted along the machining path. Applicable instead of such limit switches, or in addition thereto, are other sensing means, such as test feelers, gauges or the like, which check the work piece as to whether it possesses the desired dimensions when machined. When the dimension departs from the correct value, the test feelers may cause repetition of the machining operation or they may block the further continuance of the program.

The foregoing and other objects, advantages and features of my invention are apparent from the embodiments exemplified by the drawings, in which—

Figure 1:
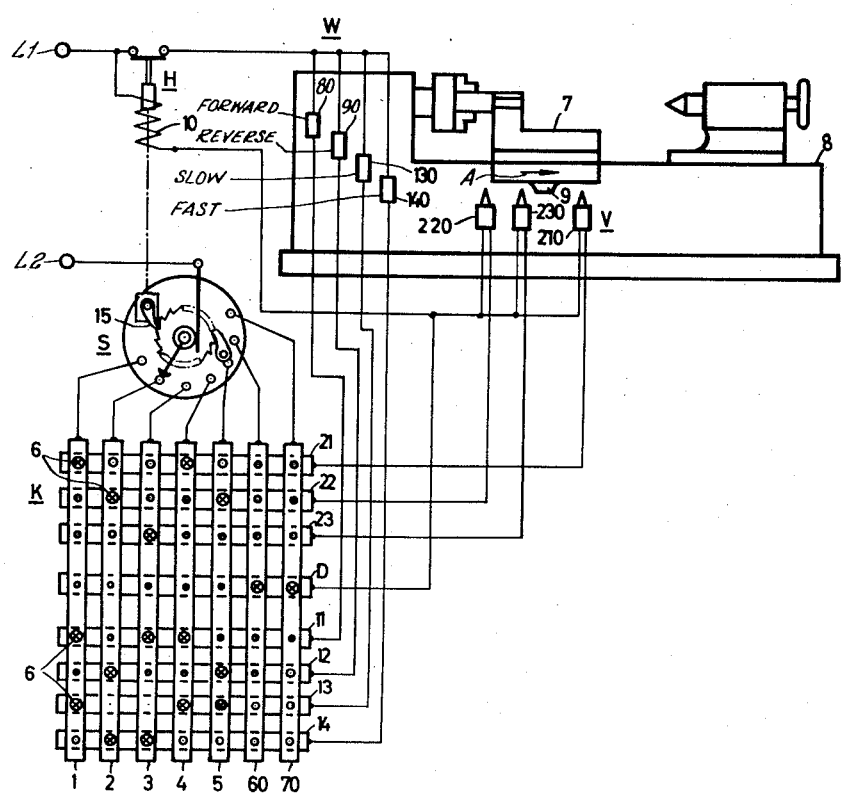
Fig. 1 illustrates schematically a lathe together with a circuit diagram of a programming control system.

The system illustrated in Fig. 1 serves for sequentially controlling the operations of a lathe 8 in accordance with a program pre-selected by means of a program controller. The controller comprises a cross-bar distributor K which has a number of longitudinal bus bars of which only a few are shown and denoted by 1 to 5, 60 and 70. The bus bars are individually and sequentially connected to voltage by means of a stepping switch S.

The distributor K is provided with a first set of cross bars 11 to 14, and a second set of cross bars 21 to 23, only a few bars being illustrated for each of these sets.

Figure 2:
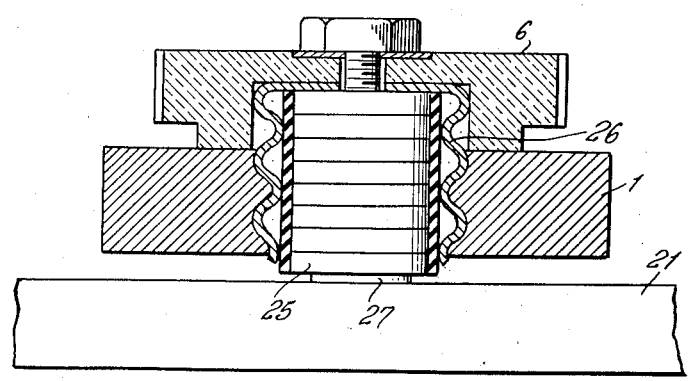
Fig. 2 is a sectional view of one of the intersections in the cross-bar distributor shown in Fig. 1.

The cross bars 11 to 14 are individually connected with signal-responsive operating devices that selectively control the operation of the machine tool. In the example of a lathe, the signal-receiving devices consist of the electromagnetic clutches 80, 90, 130 and 140 in the gear transmission W that control the tool support 7 for forward, reverse, fast and slow operation respectively, although it will be understood that any desired greater number of such devices, particularly those for speed control, may be provided in the conventional manner. The cross bars 21 to 23 of the second set are individually connected with signal-transmitting sensing means, here consisting of a group V of limit switches 210, 220, 230. Each of bus bars 1 to 5 can be connected with each of the cross bars 11 to 14 and 21 to 23 by means of connector plugs 6. The connector plugs are preferably designed as rectifiers as is shown in Fig. 2 and more fully described in a later place. The cross-bar distributor K is further provided with an additional cross bar D which, as will be explained, permits the selective insertion of idle steps into the distributing operation of the sequencing switch S.

As mentioned, the control devices 80, 90, 130 and 140 in the power transmission W of the machine tool 8 may consist of the clutches for switching the transmission forward and reverse, and for switching it to respectively different speeds. However, instead of such clutches, the signal-responsive control devices may consist of individual drives, such as individual electric motors or their respective control contactors. In the illustrated example, it is assumed that clutch 80, when energized, causes the support 7 of the machine tool 8 to run forward in the direction of the arrow A, and that clutch 90, when energized, drives the support 7 in reverse, whereas clutch 130 sets the drive for slow speed and clutch 140 sets it for fast speed in either travelling direction of the support. The support 7 is provided with a dog 9 for actuating the above-mentioned limit switches 210, 220 and 230 of the group V. The limit switches close when engaged by the travelling dog 9. The limit switches or the dog 9 may be positionally adjustable in the conventional manner for pre-setting a desired length of travel. The limit switches are all parallel-connected to the control coil 10 of a main contactor H which controls the supply of current from terminals L1 and L2 to the signal-responsive devices or clutches 80, 90, 130 and 140.

The main contactor H is shown to also control the pawl 15 of the stepping mechanism in switch S so that each opening of contactor H not only disconnects the electric power supply but also causes the sequencing switch S to advance one step.

The connection between the main contactor H and the stepping switch S, indicated by a dot-and-dash line, may be mechanical so that the magnet coil of the main contactor also supplies driving power for actuating the switch S. It will be understood, however, that the stepping mechanism of switch S may have its own electromagnetic drive which is connected with the main contactor H by an interlock relay or other intermediate relay so that the connection between main contactor H and sequencing switch S is electrical, as is the case in the embodiment described below with reference to Fig. 3. For simplicity, the conventional relays, usually interposed between the limit switches 210, 220, 230 or other sensing devices and the cross bars of the distributor K, are omitted although it is preferable to connect the limit switches with relays or contactors that render those switches inactive immediately after they have responded, so that the limit switches cannot disturb the programming performance during the interval in which they remain temporarily closed by dog 9 of support 7 subsequent to termination of a program portion. Likewise for simplicity, the conventional auxiliary devices, such as those for adjusting the speed control means or for setting the programming system for repetition of a fabricating operation, are omitted.

In the following description of the operation of the system, it is assumed that the tool of the illustrated lathe is required to work in only one dimension so that the support 7 need perform only the above-mentioned longitudinal movement. When operating in two or more dimensions, that is, when the tool must also be fed toward and away from the work piece, the number of the signal-receiving control devices and the number of the sensing means or limit switches for issuing the stop signals are to be increased accordingly.

The illustrated system operates as follows. With the connector plugs 6 distributed as illustrated in Fig. 1, the supply of direct current to terminal L1 and L2, for instance by closing of a main switch, has the effect of placing voltage through sequencing switch S on the bus bar 1. The uppermost plug 6 in bus bar 1 connects this bar with the cross bar 21 and thus prepares an operating circuit for the limit switch 210. The limit switches 220 and 230 are inactive during the first portion of the program and hence cannot effect any switching operations when being travelled over by the dog 9 of support 7. Due to the plugging of cross bars 11 and 13, the clutch-control devices 80 and 130 are also connected with bus bar 1 so that the machine tool is set for slow forward run of the support 7. Hence the support commences travelling in the direction of the arrow A. When dog 9, after termination of this fabricating portion of the program, engages the limit switch 210, the switch opens the circuit of coil 10 so that contactor H drops off. This stops the support 7 and simultaneously advances the sequencing switch S into contact with the bus bar 2. This bar is connected by plugs 6 with cross bars 22, 12 and 14. Cross bar 22 prepares the stop-signal circuit for limit switch 220. Limit switches 210 and 230 remain inactive. The plugging of cross bars 12 and 14 sets the driving transmission W of the machine for fast return movement of the support 7. The return movement commences immediately because the switching from bus bar 1 to bar 2 opens the circuit of limit switch 210 so that coil 10 is deenergized and contactor H closed at the moment when switch S applies voltage to bus bar 2. The support 7 now travels in the direction opposed to that of arrow A at high speed until dog 9 engages the limit switch 220 which then deenergizes the contactor H so that the sequencing switch S passes from bus bar 2 to bar 3. Bus bar 3 is plugged together with cross bars 23, 11 and 14. Cross bar 23 prepares a circuit for limit switch 230 while now the other two limit switches remain inactive. The cross bars 11 and 14 energize the clutch control devices 80 and 140 for fast forward run of support 7. This forward run commences immediately because the circuit of limit switch 220 was previously interrupted by the switching from bus bar 2 to bus bar 3 so that the main contactor H is closed. During the fast forward run of support 7, the dog 9 moves from limit switch 220 to limit switch 230 which then again disconnects the power supply and causes the sequencing switch to advance another step.

During the rapid forward run last mentioned, the machine tool performs some fabricating operation which may require a change in setting of the tool, for example a tool-feeding movement; however, as mentioned, the operation for machining in the second dimension is not further illustrated because the control operations to be performed and the devices used for this purpose are analogous to those shown and described.

After the limit switch 230 has opened the contactor H and the sequencing switch S has passed from bar 3 to bar 4, further fabricating portions of the program are controlled in a similar manner.

After the program portion correlated to the bus bar 5 is completed, the sequencing switch S passes to bus bar 60 which, in the illustrated example, is shown connected by a plug 6 with the idler bar D. Bar D is so connected as to by-pass all limit switches V. Hence this switching step has the same effect as if any one of the limit switches had responded so that the sequencing switch S receives another pulse and advances immediately to bus bar 70. Since this bus bar is also connected with idle bar D, another advancing step is imparted to the sequencing switch S. Consequently, if a particular program does not require use of all available switching steps, this being the case in the present example where the available bus bars 60 and 70 are not needed for the pre-adjusted program, then the unnecessary steps can be plugged onto the idler bar D which causes the sequencing switch to automatically pass through the superfluous steps until it arrives at the next bus bar not connected with the idler bar D. The sequencing switch then stops and remains connected with the latter bus bar until the program portion correlated to that bar is completed.

Any other desired programs may be selected by changing the plug connections of the cross bar distributor K, and by changing the setting of the dog 9 or of the limit switches V. In principle, the resulting control operation in each case is similar to the one described above. Regardless of the number of clutches or other signal-responsive control devices and regardless of the number of limit switches or other signal transmitters, a programming control system according to the invention can be made to operate, for any selected program, with only one or two power-control contactors, namely the main contactor H and, preferably, an auxiliary contactor such as the one denoted by Sp in Fig. 3 and described further below.

As shown in Fig. 2, each plug 6 is essentially similar to a conventional fuse plug, except that it contains a stack 25 of rectifier cells of the dry type, such as silicon rectifiers. For operation with direct current, the rectifier stack may form a half-wave or valve rectifier so that it permits current flow from the bus bar to the cross bar but prevents current flow in the opposite direction. The plug 6 has a threaded metal sleeve 26 in engagement with a threaded bore of the bus bar. The sleeve 26 contacts the upper electrode of the rectifier stack 25, whereas the lower electrode 27 of the stack abuts against the cross bar.

Each plug thus prevents the flow of current from the one bus bar that is under voltage at a time, into undesired control channels. For example, when switch S puts voltage on bus bar 1, current can flow from this bar through plugs 6 to cross bars 21, 11 and 13; but no current can flow from cross bar 21 into bus bar 4 although this bar is also connected with cross bar 21 by a rectifier plug. Similarly, no current can flow from bus bar 1 via cross bar 11 into bus bars 3 and 4, although the latter two bars are also connected with cross bar 11 by rectifier plugs 6. The provision of rectifier plugs thus obviates the otherwise necessary electric interlocking by means of contactors or relays.

The number of dogs 9 on the tool support or other machining devices to be controlled may be increased, for example so that during a single fabricating portion of the program a plurality of different dogs sequentially actuate the same limit switch, the connector plugs in the cross-bar distributor being then set in corresponding manner.

As apparent from the above-described embodiment, the setting-up of a control program is extremely simple and results in a plug arrangement which offers a readily visual synopsis of the program and thus minimizes the risk of programming errors. By virtue of the simple design and the comparatively simple lay-out of the electric circuits, the system also affords utmost reliability.

In cases where extensive programming is required and it is undesired to provide large-area cross-bar distributors, two or more such distributors may be provided for sequential operation. For example, when the first operating sequencing device reaches the last bus bar of the first cross-bar distributor, the further programming duty may be automatically transferred to a second selector chosen by correspondingly plugging the first distributor; and the second selector unit then takes care of continuing the control program. The cross-bar selector units in such a multiple system can be accommodated within relatively small space while still affording ready inspection and recognition of the pre-set program. For example, the various selector units of a multiple-unit system may be mounted on panels that can be turned over like the pages of a book. Furthermore, a system according to the invention also permits an automatic transfer from a first to a second selector unit at a stage when the first unit has not yet completed its entire available sequencing travel; and the second selector unit can then be set by plugs to automatically switch back to the first unit which then continues sequencing after the program portion of the second selector unit is completed. Such and similar designs of the control system are particularly advantageous if the operations to be controlled involve machining in more than one dimension or require the use of different machining tools. In this case, each dimension or each tool may be correlated to a different selector unit. The plugging of the cross-bar distributors can be facilitated by providing different stencils for respectively different programs; the stencils are placed onto the cross-bar distributors and are perforated only at those locations where a plug is to be inserted. For control in more than one machining dimension or of more than one tool, the number of the sets of cross bars can be increased accordingly, for example so that a set of command-signal bars (such as bars 11 to 14) and a set of stop-signal bars (such as bars 21 to 23) are available for each individual dimension or tool.

Figure 3:
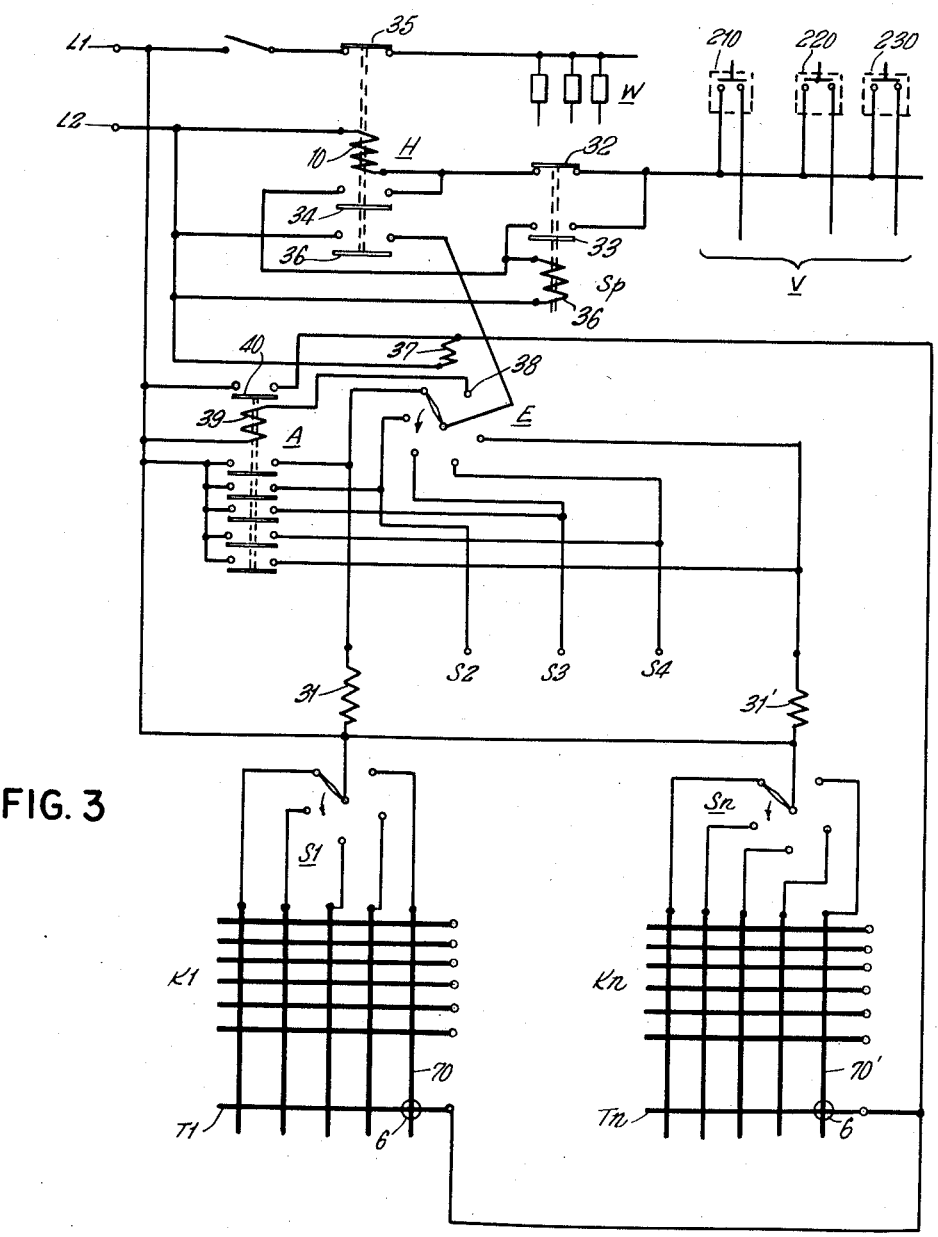
Fig. 3 illustrates the circuit diagram of a modified control system otherwise similar to that illustrated in Fig. 1.

The embodiment illustrated in Fig. 3 is an example of a program-control system with a number of sequencing units transferring the programming duty between each other for sequential or cyclical operation as described in the foregoing.

The system has a number of sequencing units S1 to Sn of which only the first and last units are shown. Each unit comprises a cross-bar distributor K1 or Kn with appertaining stepping switches S1 and Sn respectively. Each distributor, shown only schematically, has two sets of cross bars and preferably also an idler bar corresponding to bars 11 to 14, 21 to 23 and D, respectively, in Fig. 1. In addition, each of distributors Kl, Kn has another cross bar Tl or Tn for transfer control.

In addition, a master sequencing switch E has its bank contacts connected with the respective stepping-switch coils, such as coils 31 and 31', of the sequencing units Sl and Sn.

The system is further provided with a blocking contactor Sp for coaction with the main contactor H. The blocking contactor operates as follows: When one of the sensing devices V, for instance the limit switch 220, closes for initiating the next following fabricating operation, the main contactor H is supposed to pick up only after the limit switch 220 again opens for a short interval of time. For this purpose, the energizing circuit of coil 10 in main contactor H extends through a normally closed contact 32 of blocking contactor Sp; and contact 32 is shunted by a normally open self-holding contact 33 of contactor Sp in series with a normally open interlock contact 34 of contactor H. When, for instance, the limit switch 220 responds and closes, coil 10 of main contactor H is energized through contact 32. Contactor H picks up and interrupts the energizing circuit of the signal-responsive devices W at main contact 35 while simultaneously closing the interlock contact 34. Contact 34 now applies voltage to coil 36 of relay Sp. Relay Sp picks up and seals itself in through contact 33 until thereafter the limit switch 220 opens at least for a short interval of time. Then both contactors Sp and H drop off so that both are in the original condition. Subsequent closing of the limit switch 220 again applies voltage to the coil 10 of main contactor H through the contact 32.

Simultaneous with the opening of the main contact 35 in contactor H, this contactor closes a control contact 36 which passes a voltage pulse through the selector switch E to the one sequencing unit to which the movable contact member of switch E is connected at that time. Assume that the opening of contact 35 in main contactor H takes place when switch E is in the illustrated position. Then the coil 31 of stepping switch Sl in the first sequencing unit receives a pulse which causes the switch to advance one step. Each subsequent pulse issuing from main contactor H causes the sequencing unit Sl to further advance stepwise and to control its portion of the machining program in the manner described above with reference to Fig. 1. When the sequencing switch Sl reaches the last step, it applies a voltage pulse through bus bar 70 to the cross bar T*l* connected with bus bar 70 by a plug 6, and thus to the stepping-switch coil 37 of selector E which then advances one step and thus connects the next sequencing unit S2 with the control contact 36 of main contactor H. From now on the second sequencing unit controls its portion of the program until its selector switch reaches the last bus bar plug-connected with a transfer bar so that the selector E again advances one step. This operation is repeated until selector E connects the last sequencing unit S*n* with control contact 36 of contactor H. When the unit S*n* has reached its last bus bar 70', the coil 47 of selector E receives a pulse through transfer bar T*n* and passes its movable contact member onto a bank contact 38 which energizes the coil 39 of a control relay A. Relay A closes its normally open contacts which apply voltage to all stepping switches S1 to S*n* which shortly previous were all in the respective last positions. As a result, all sequencing units are advanced one step to their respective starting positions. Simultaneously, a contact 40 of relay A applies an energizing pulse to the coil 37 of selector switch E which also advances one step to its starting position. Now the first sequencing unit S1 is again capable of commencing the above-described cycle of programming operation.

By plug-connecting the transfer bar T1 in distributor K1 with any bus bar other than, or in addition to, the last bus bar 70, the other sequencing units can be put into operation when the first sequencing unit reaches any preselected position, and the first unit will then resume its programming duty only after the other units have completed their interspersed control cycle.

It will further be understood that by providing each of the sequencing units with an idler bar D as described above with reference to Fig. 1, any desired number of the program steps available in each unit can be utilized. For example, if the last unit S*n* is to control only three steps of operation, it can be made to idle through all remaining steps until it reaches the last bus bar 70'. In this manner a system of this type permits being set for a great variety of different control programs by selecting not only the number of sequencing units that are to participate in a program but also any desired number and combination of active steps within each of the individual sequencing units.

It will be obvious to those skilled in the art, upon studying this disclosure, that my invention permits of various modifications other than those particularly illustrated and described herein, without departing from the essential features of the invention and within the scope of the claims annexed hereto.

I claim:

1. With a machine tool having selectively actuable speed and direction control means and having electric sensing means responsive to a given performance of said control means, the combination of a program-control system comprising a cross-bar distributor having parallel bus bars, two sets of cross bars extending transverse to said bus bars, connectors for electrically connecting said bus bars with said cross bars at selected points of intersection, current supply means, a stepping switch sequentially connecting said supply means with said bus bars, electric circuit means connecting said machine-tool control means to respective cross bars of one of said sets so as to selectively actuate said control means under control by said stepping switch, and electric circuit means connecting said sensing means to said stepping switch and to respective cross bars of said other set for controlling said switch to advance one step upon response of one of said respective sensing means.

2. With a machine tool having selectively actuable speed and direction control means and having electric sensing means responsive to a given performance of said control means, the combination of a program control system comprising a cross-bar distributor having parallel bus bars and two sets of cross bars and selectively insertable rectifier plugs electrically interconnecting said bus bars and said cross bars at chosen points of intersection so as to permit current flow in only one direction between said interconnected bars, a stepping switch sequentially connecting said supply means with said bus bars, electric circuit means connecting said machine-tool control means to respective cross bars of one of said sets so as to selectively actuate said control means under control by said stepping switch, and electric circuit means connecting said sensing means to said stepping switch and to respective cross bars of said other set for controlling said switch to advance one step upon response of one of said respective sensing means.

3. A cross-bar distributor system for program control of machinery, particularly machine tools, comprising parallel bus bars, two sets of cross bars extending transverse to said bus bars, connectors for electrically connecting said bus bars with said cross bars at selected points of intersection, current supply means, a stepping switch sequentially connecting said supply means with said bus bars, a group of signal-responsive operating devices connected to respective cross bars of one of said sets so as to selectively receive operating power under control by said stepping switch, a group of signal transmitters responsive to termination of operation of said devices, said transmitters being connected to respective cross bars of said other set, and circuit means connecting said transmitters to said stepping switch for controlling said switch to advance one step upon response of one of said respective transmitters.

4. A program-control system according to claim 3, comprising an additional cross bar connected to said stepping switch independently of said signal transmitters, whereby connecting said additional cross bar by one of said connectors with one of said respective bus bars causes said switch to pass idly through an inactive step of the control program.

5. A program-control system, comprising a plurality of cross-bar distributors each having parallel bus bars and two sets of cross bars and connectors for electrically interconnecting said bus bars and cross bars at selected points of intersection, current supply means and a stepping switch sequentially connecting said supply means with said bus bars; said respective stepping switches of said distributors being operable individually, selective control means connected with said stepping switches for rendering a selected one of them operative at a time, said control means being connected to one of said distributors to transfer from the stepping switch of said one distributor to the stepping switch of another distributor when said one distributor reaches a predetermined stepping position; signal-responsive operating devices connected to respective cross bars of one of said sets of cross bars in each of said distributors so as to be selectively actuated under control by said stepping switches; signal transmitters responsive to a given performance of said devices, said transmitters being connected to respective cross bars of said other set of cross bars in each of said distributors and being connected to said stepping switches for controlling the switch of the one active distributor to advance one step upon response of one of said respective transmitters.

6. A cross-bar distributor system for program control of machine tools having selectively actuable speed control means and direction control means, comprising parallel bus bars, at least two sets of cross-bars extending transversely to said bus bars, selectively insertable rectifier plugs electrically interconnecting said bus bars and and said cross-bars at selected points of intersection so as to permit current flow in only one direction between said interconnected bars, current supply means, a stepping switch sequentially connecting said supply means with said bus bars, and electric circuit means connecting said machine-tool speed and direction control means to respective cross-bars of one of said sets so as to selectively actuate said control means under control by said stepping switch.

7. With a machine tool having a travelling member and selectively actuable control means for varying the speed and direction of travel as well as limit switch means for sensing the length of travel of said travelling member, the combination of a program control system comprising a cross-bar distributor having parallel bus bars and at least two sets of cross-bars extending transversely to said bus bars, one set being electrically connected with said control means to selectively actuate same, a second set of said cross-bars being electrically connected to said limit switch means, and selectively insertable rectifier plugs electrically interconnecting said bus bars and said cross-bars at chosen points of intersection so as to permit current flow in only one direction between said interconnected bus bars and cross-bars, current supply means, a stepping switch sequentially connecting said supply means with said bus bars, electric circuit means connecting said machine-tool speed and direction control means to respective cross-bars of one of said sets so as to selectively actuate said control means under control by said stepping switch, and electric circuit means connecting said limit switch means to said stepping switch and to respective cross-bars of said other set for controlling said switch to advance one step upon response of a respective limit switch means.

8. A combination according to claim 7, said machine tool having a power transmission and said selectively actuable control means for varying the speed and direction of travel of said travelling member comprising clutch means actuable for selectively switching said transmission forward and reverse in both longitudinal and transverse directions, and for switching said transmission to respectively different speeds.

9. A combination according to claim 7, said selectively actuable control means for varying the speed and direction of travel of said travelling member comprising a plurality of individual drive means for driving said travelling member.

References Cited in the file of this patent

UNITED STATES PATENTS 2,511,821     Bullard et al.  ----------- June 13, 1950